G. S. BILLMAN.
APPARATUS FOR CLEANING INTESTINES.
APPLICATION FILED FEB. 23, 1910.
998,597.
Patented July 25, 1911.
2 SHEETS—SHEET 1.
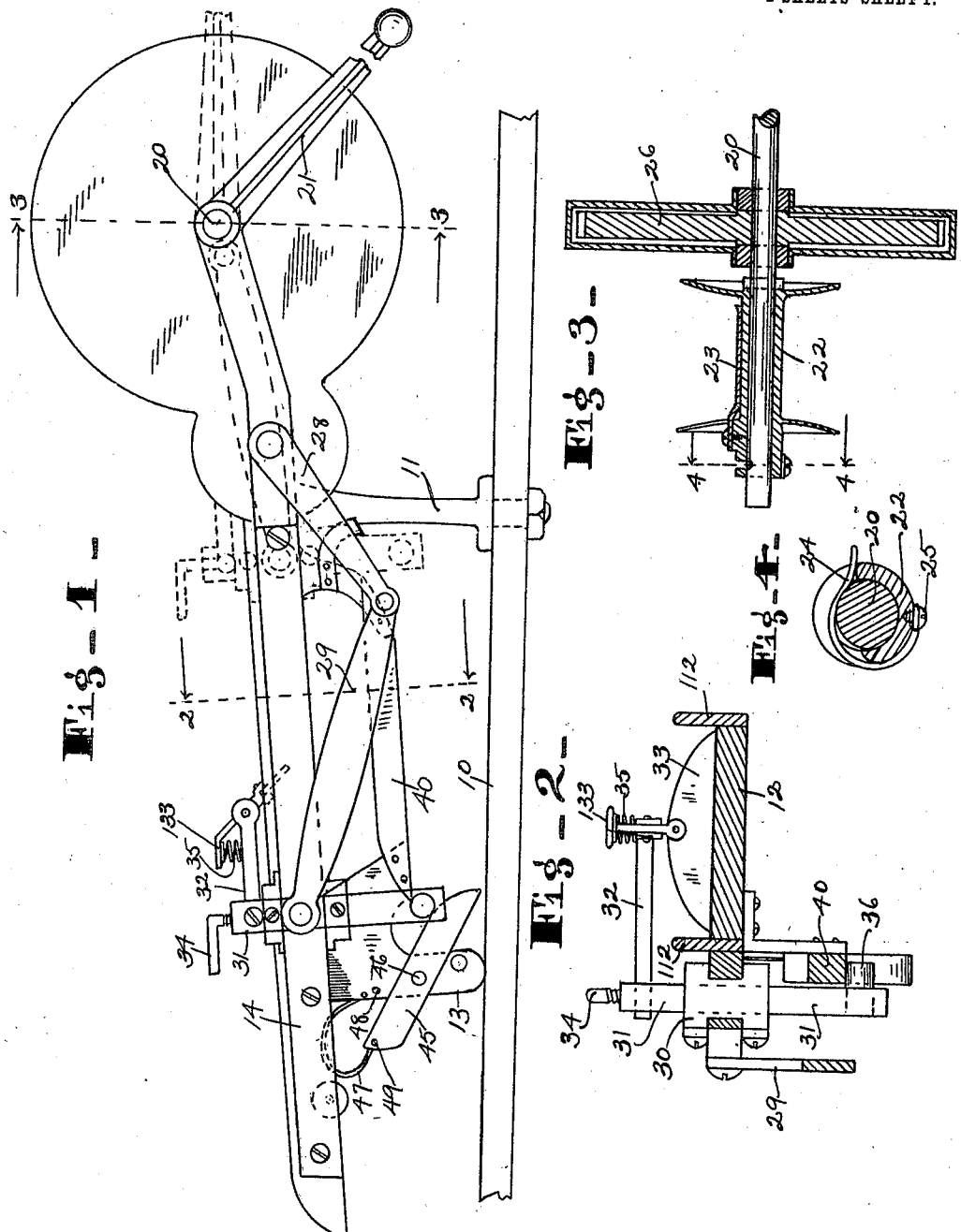
WITNESSES:
INVENTOR.
Gustus S. Billman.
BY
ATTORNEY.

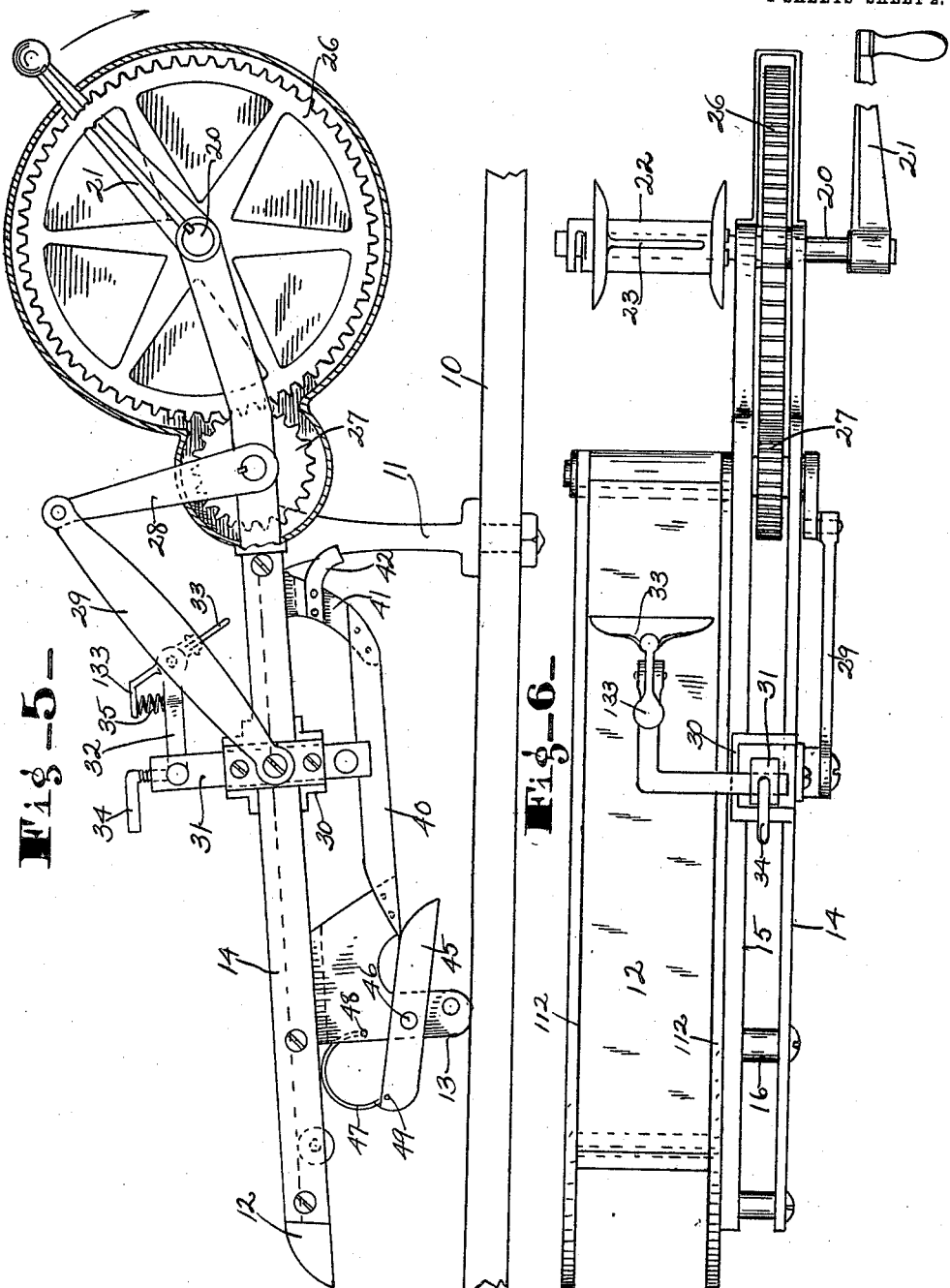

UNITED STATES PATENT OFFICE.

GUSTUS S. BILLMAN, OF SHELBYVILLE, INDIANA.

APPARATUS FOR CLEANING INTESTINES.

998,597.

Specification of Letters Patent. Patented July 25, 1911.

Application filed February 23, 1910. Serial No. 545,541.

*To all whom it may concern:*

Be it known that I, GUSTUS S. BILLMAN, of Shelbyville, county of Shelby, and State of Indiana, have invented a certain new and useful Apparatus for Cleaning Intestines; and I do hereby declare that the following is a full, clear, and exact description thereof, reference being had to the accompanying drawings.

The object of this invention is to provide an improved device for cleaning intestines of animals for sausages and other uses.

The chief feature of the invention consists in providing a reciprocating scraper which scrapes the intestine while the scraper moves in one direction, and is elevated and disengaged therefrom while returning. For this purpose the intestine may be held or manipulated by hand on the table, but there is provided in this invention means for drawing it across the table at a much slower speed than the movement of the scraper, whereby the scraper will scrape the same surface of the intestine several times.

The specific feature of the invention consists in providing a horizontal table over which the intestine is slowly drawn, and a frame which reciprocates along the edge of the table and carries a vertically movable scraper holder in it and a guide bar located parallel with the table, which is engaged by said scraper holder and arranged so that it will hold it down while it is moved in one direction, and hold it elevated while it is being moved in the other direction.

The nature of the invention will be understood from the accompanying drawings and the following description and claims.

In the drawings Figure 1 is a side elevation of the device showing one position of the parts in dotted line. Fig. 2 is a transverse section on the line 2—2 of Fig. 1. Fig. 3 is a transverse section on the line 3—3 of Fig. 1. Fig. 4 is a section on the line 4—4 of Fig. 3. Fig. 5 is a side elevation of the device with one side of the gear casing cut away and in section. Fig. 6 is a plan view of the device.

The device is mounted upon a bench 10 or other suitable support by means of a screw post 11 supporting the table 12 at one end, and a plate 13 supporting it at the other end. The table 12 is inclined somewhat downwardly and rearwardly, and there are side bars 112, as shown in Fig. 2, if desired. Along one side there is a frame secured to the table and projecting forwardly beyond the table, as shown in Fig. 6. This frame consists of an outer bar 14 and an inner bar 15 secured together by spacers 16. In the forward end of this side frame there is mounted a horizontal shaft 20 which is actuated by a crank 21 and carries a spool 22 which contains a spring finger 23 under which one end of an intestine may be slipped and held so that the intestine may be wound upon said spool 23 during the cleaning operation. In order to prevent the spool driving means from pulling an intestine so hard as to break or sever it, the spool is held frictionally on the shaft 20, as shown in Figs. 3 and 4, by the spring 24, which at one end is secured to the spool by a screw 25, and the other end bears frictionally upon the shaft.

The shaft 20 carries a relatively large gear 25 on it between the frame bars 14 and 15 and meshes with a relatively small gear 27 mounted in the same frame, which actuates a crank 28 that is pivotally connected with a connecting rod 29 and runs to a scraper frame 30. This scraper frame reciprocates in the frame formed of the bars 14 and 15 and secured to the side edge of the table.

The scraper frame 30 has a vertical opening in it for the scraper holder 31 which rests loosely therein so as to be vertically movable. At its upper end it carries the arm 32 on which the scraper 33 is pivoted between its ends, and said arm 32 is held in place by the set screw 34. The lower and forward end of the scraper is as wide substantially as the table 12, see Fig. 6, while the rear end 133 is narrow, and between said rear end and the arm 32 there is a spring 35 which presses upwardly on the rear end of the scraper and down on the front of the scraper so as to hold the forward end yieldingly in a downward position.

The scraper holder 31 carries a laterally extending roller 36 on its lower end, see Fig. 2, which travels over and under the guide bar 40 that is secured in the forward end of the bracket 41 and to the rear end of the plate 13. When the scraper reaches the forward limit of its movement the scraper support drops off the forward end of the guide bar 40, by gravity, but the deflecting arm 42, which is curved downwardly, helps force the scraper to its downward position by engagement of the roller 36. As the scraper moves rearwardly, the bar 40 holds the scraper down to its work, for the roller 36 travels under said bar during such movement, as shown in Fig. 2. When the roller 36 reaches the rear end of the bar 40 it rides up on a trip 45 which is pivoted to the plate 13 at 46, and the spring 47 that is fastened at 48 on the plate 13, and at 49 on the trip 45, holds the rear end of the trip against the rear end of the guide bar 40, but said spring 47 is very weak so it permits the roller 36 to ride upon the trip 40 to the limit of the rearward movement of the scraper, and on the return movement of the scraper said roller 36 rides from the trip bar 45 upon the upper surface of the guide bar 40, as the upper surface of said bar 40 at its rear end is beveled to cause it to register with the upper surface of the trip 45. This is illustrated in Fig. 5. Therefore, as the crank 21 is operated in the direction indicated by the arrow in Fig. 5, the intestine will be drawn longitudinally across the table 12 at a very slow speed, while the scraper will be reciprocated much faster, coming down upon and scraping the intestine during the rearward movement of the scraper and being lifted up out of engagement with the intestine during the return movement of the scraper.

What I claim as my invention and desire to secure by Letters Patent is:

1. Apparatus for cleaning intestines including a stationary table upon which an intestine may be extended, a scraper frame reciprocable beside the table, a scraper vertically movable in said frame, and means for elevating said scraper in said frame during the movements of the frame in one direction.

2. Apparatus for cleaning intestines including a table upon which an intestine may be extended, a scraper frame reciprocable along the edge of the table, a scraper, a scraper holder movable in said scraper frame at a right angle to the table, and a guide for causing the movements of the scraper holder during the reciprocation of the scraper frame.

3. Apparatus for cleaning intestines including a table upon which an intestine may be extended, a scraper frame reciprocable along the edge of the table, a scraper, a scraper holder movable in said scraper frame at a right angle to the table, a guide bar parallel with the table that engages and holds the scraper holder in a scraping position while being moved in one direction, and a trip for causing the scraper holder to move along the opposite side of the guide while the scraper is moving in the other direction.

4. Apparatus for cleaning intestines including a substantially horizontal table upon which an intestine may be extended, a scraper frame reciprocable along the edge of the table, a scraper, a scraper holder vertically movable in said scraper frame, a guide bar parallel with the table the underside of which is engaged by the scraper holder during the scraping movement, and a spring controlled trip at the end of said guide for causing the scraper holder to ride upon the guide bar for holding the scraper elevated during the return movement.

5. Apparatus for cleaning intestines including a substantially horizontal table upon which an intestine may be extended, a scraper frame reciprocable along the edge of the table, a scraper, a scraper holder vertically movable in said scraper frame, a guide bar parallel with the table the underside of which is engaged by the scraper holder during the scraping movement, a spring controlled trip at the end of said guide for causing the scraper holder to ride upon the guide bar for holding the scraper elevated during the return movement, a spool for drawing the intestine over the table, a shaft on which said spool is mounted, a large gear on said shaft, a smaller gear meshing with said large gear, a crank driven by said smaller gear, and a connecting rod between said crank and the scraper frame, whereby the scraper will be moved more rapidly than the intestine.

In witness whereof, I have hereunto affixed my signature in the presence of the witnesses herein named.

GUSTUS S. BILLMAN.

Witnesses:
G. H. BOINK,
H. TURNBELL.

Copies of this patent may be obtained for five cents each, by addressing the "Commissioner of Patents, Washington, D. C."